United States Patent [19]

Maucher et al.

[11] 4,238,019
[45] Dec. 9, 1980

[54] FRICTION CLUTCH

[75] Inventors: Paul Maucher, Sasbach; Oswald Dubiel, Bühl, both of Fed. Rep. of Germany

[73] Assignee: LuK Lamellen und Kupplungsbau GmbH, Bühl, Fed. Rep. of Germany

[21] Appl. No.: 930,978

[22] Filed: Aug. 4, 1978

Related U.S. Application Data

[63] Continuation of Ser. No. 718,518, Aug. 30, 1976, abandoned.

[30] Foreign Application Priority Data

Aug. 30, 1975 [DE] Fed. Rep. of Germany ....... 2538662

[51] Int. Cl.³ .................. F16D 21/06; F16D 13/71
[52] U.S. Cl. .................. 192/99 A; 192/48.8; 192/70.3
[58] Field of Search ............ 192/70.29, 70.3, 48.8, 192/99 A, 48.9, 109 R, 93 B

[56] References Cited

U.S. PATENT DOCUMENTS

| 1,716,436 | 6/1929 | Gamble | 192/70.29 |
|---|---|---|---|
| 2,045,557 | 6/1936 | Almen et al. | 192/70.29 X |
| 2,168,960 | 8/1939 | Morris | 192/99 A X |
| 2,176,224 | 10/1939 | Nutt | 192/70.29 X |
| 2,278,578 | 4/1942 | Zeller et al. | 192/109R |
| 2,436,874 | 3/1948 | Spase | 192/70.3 X |
| 2,993,576 | 7/1961 | Carlin et al. | 192/99 A X |
| 3,179,220 | 4/1965 | Sink | 192/48.9 |
| 3,254,747 | 6/1966 | Werner | 192/98 |
| 3,590,968 | 7/1971 | Binder | 192/99 A |
| 3,779,353 | 12/1973 | Maucher | 192/70.29 X |

FOREIGN PATENT DOCUMENTS 1251708 10/1971 United Kingdom ............... 192/99 A Primary Examiner—Allan D. Herrmann
Attorney, Agent, or Firm—Herbert L. Lerner

[57] ABSTRACT

Friction clutch includes a pressure plate, a lever for actuating the pressure plate, and linkage means connecting the lever to the pressure plate, the lever being formed of at least two stamped-out sheet-metal parts and at least two spacer members holding the sheet-metal mutually spaced at a fixed distance from one another.

13 Claims, 4 Drawing Figures

FRICTION CLUTCH

This is a continuation, of application Ser. No. 718,518 filed Aug. 30, 1976, now abandoned.

The invention relates to a friction clutch such as, for example, a double or dual-disk clutch for motor vehicles, wherein levers provided for actuating pressure plates are formed of sheet metal, each of the levers being connected to a respective pressure plate by a connecting linkage, such as a compressive or tensioning element.

Levers for friction clutches can be pressed or stamped out of sheet metal and usually have a cross section with a somewhat U-shaped profile such as has become known heretofore, for example, from the German Petty Patent DBGM 6 608 300. Such levers, however, have a disadvantage in that they are very costly to manufacture, because complex tools are required, and have a further disadvantage in that the bearing locations as well as the abutment or run-up locations for the pressure element or the releasing or disengaging bearing must additionally be hardened, which results in distortion due to the hardening that can cause the levers or the actuating elements to jam in their bearings.

It is accordingly an object of the invention of the instant application to provide a friction clutch which avoids the foregoing disadvantages of the heretofore known friction clutch, and furthermore to provide such a clutch with a lever formed of sheet metal and which is lightweight and simple and therefore also inexpensive to produce, and functions reliably.

With the foregoing and other objects in view, there is provided, in accordance with the invention, in a friction clutch, a pressure plate, a lever for actuating the pressure plate, and linkage means connecting the lever to the pressure plate, the lever being formed of at least two stamped-out sheet-metal parts and at least two spacer members holding the sheet-metal parts mutually spaced at a fixed distance from one another.

In accordance with other features of the invention, the spacer members are stepped rivets or individual or multipartite riveted sleeves or bushings.

In accordance with a further feature of the invention, one of the spacer members serves as a pivot bearing for the linkage means connecting the lever to the pressure plate, the linkage means being received between the mutually spaced sheet-metal parts. In this regard, the linkage means are, for example, a pressure element or compression member or a tie rod, in the form of an eye-bolt or the like.

In accordance with an additional feature of the invention, wherein the friction clutch is in combination with disengagement or releasing means for disengaging the clutch, and wherein one of the spacer members is disposed at a location of the lever radially inward of the clutch and being operatively actuatable by the disengagement means for disengaging the clutch.

In accordance with an added feature of the invention, the spacer members have a metallurgically hardened surface, at least at engagement or abutment surfaces thereof.

The construction of sheet-metal levers according to the invention is especially simplified and inexpensive, in accordance with another feature of the invention wherein the stamped-out sheet-metal parts are flat and of congruent and, accordingly, substantially identical shape.

In accordance with yet another feature of the invention the lever is a one-arm lever, and the linkage means connecting the lever to the pressure plate is a pressure element or compression member having a portion thereof partly surrounding, in the form of a fork or bifurcation, one of the spacer members and extending in radial direction of the friction clutch. In accordance with yet a further feature of the invention, the portion of the pressure element partly surrounding the one spacer member i.e. the tines of the bifurcation, extends radially inwardly of the friction clutch.

In accordance with an added feature of the invention, the friction clutch includes a housing, and a pivot pin pivotally securing the one-arm lever to the housing, the pressure element or compression member being formed with an abutment surface engageable by the pivot pin, the abutment surface extending in axial direction of the friction clutch. The pivot pin thus serves to mount or as a bearing for the lever, so that the pressure element can be braced on this pivot or bearing pin under the action of centrifugal force.

In accordance with an additional feature of the invention, the pressure element or compression member is a stamped-out part.

In accordance with a further feature of the invention and regardless of the construction of the pressure element, the friction clutch includes a housing, and a pivot pin pivotally securing the one-arm lever to the housing, the stop surface extending in radial direction of the friction clutch and serving as a bearing for the lever and engaging the pivot pin from below, between the pivot pin, which serves as a counterstop, and the pressure element, for limiting movement of the lever in a direction opposite the clutch releasing or disengaging direction.

In accordance with yet an additional feature of the invention, the friction clutch includes a clutch disk and friction linings, and wherein the stop surface and the counterstop pivot pin are disposed at a distance from one another corresponding substantially to the lining-thickness wear that is to be expected in the associated clutch disk.

In accordance with a concomitant feature of the invention, the clutch is a double clutch for motor vehicles and includes two pressure plates and a respective lever for actuating each of the levers being formed of two stamped-out sheet-metal parts mutually spaced apart at a fixed spacing from one another by the spacer member.

Assurance is thereby initially provided that potential damage will be avoided which could be caused when, during transport or shipment and if the clutch is lifted by the one-arm releasing or disengaging lever, these levers are swung outwardly so far that the restoring springs will be bent out of shape or that the pressure element will be able to snap out of its lower anchor point, whereby subsequently functional trouble and failures are possible after assembly of the clutch.

By means of the abutment or stop, assurance is provided that damage to the friction surface of the pressure plate, the housing or the flywheel by the lining rivets, with maximal wear of the lining, is avoided.

Other features which are considered as characteristic for the invention are set forth in the appended claims.

Although the invention is illustrated and described herein as embodied in friction clutch, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which.

Figure 1:
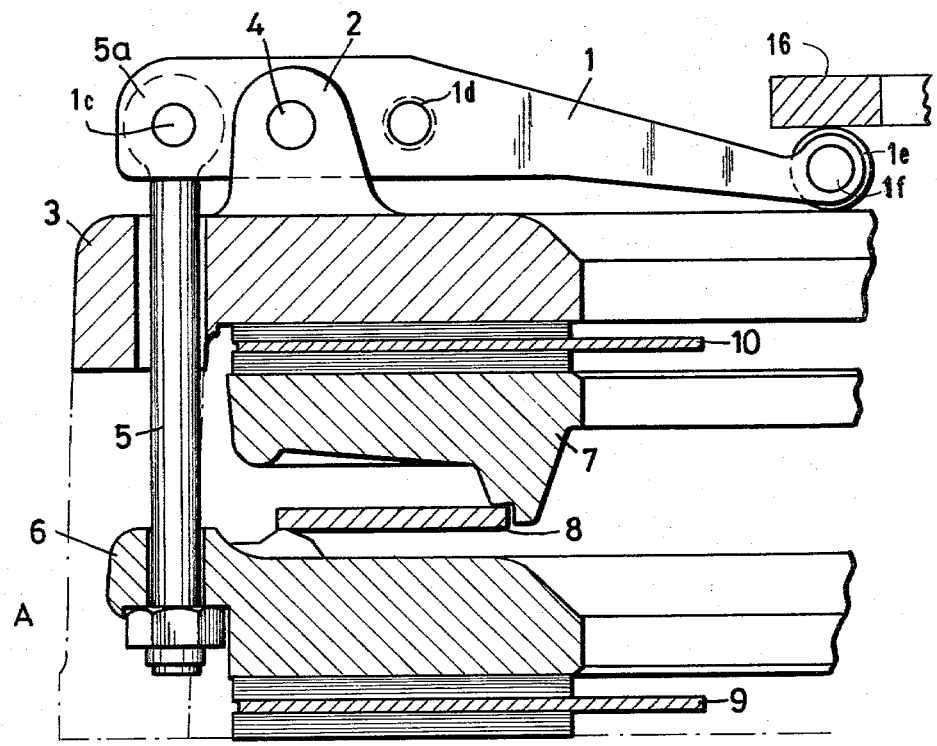
FIG. 1 is a half cross-sectional view of a double clutch with an actuating system for one clutch of the double clutch, in accordance with the invention.
Figure 3:
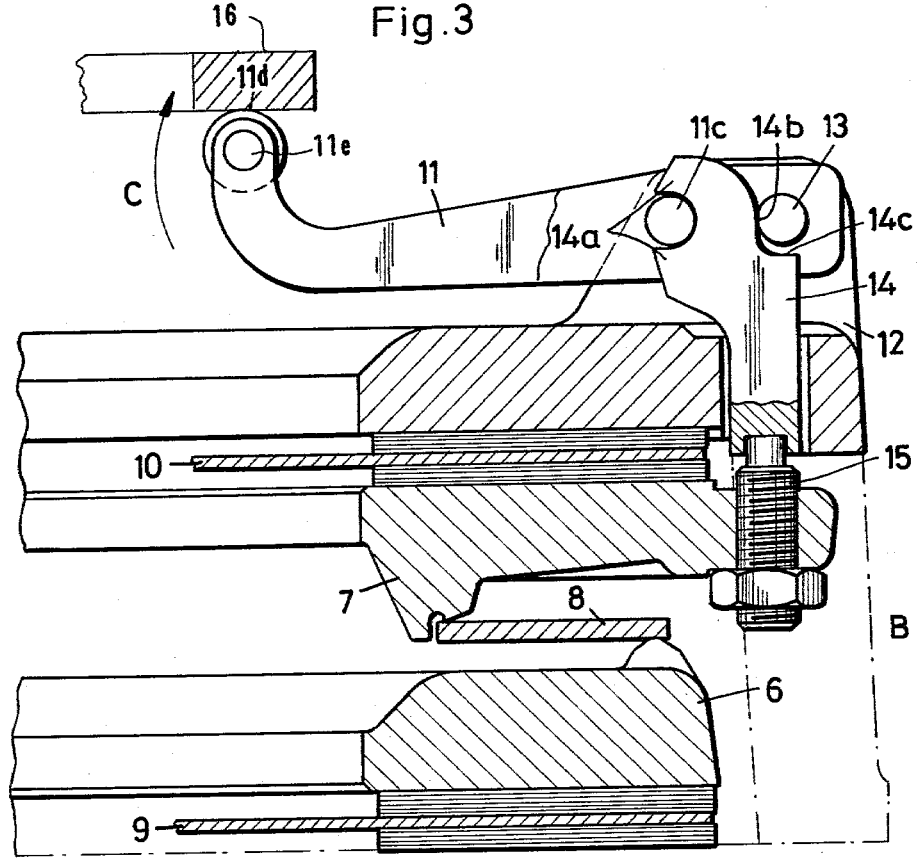
FIG. 3 is another half cross-sectional view of the double clutch of FIG. 1 showing the actuating system for the other clutch of the double clutch.

Referring now to the drawing and first, particularly, to FIG. 1 thereof, there is shown an actuating system for one clutch A of a double clutch having a radially inner and radially outer region, as shown in the drawing, the actuating system being formed of a two-armed lever or bellcrank 1, which is pivoted at a bearing block 2 of a housing 3 by means of a pin 4. A tie rod 5 in the form of an eye-bolt connects the radially outer part of the lever to the pressure plate 6 of the one clutch A. Between the pressure plate 6 of the clutch A and the pressure plate 7 of the other clutch B, a plate or cup spring 8 is provided, which acts upon both of the pressure plates 6 and 7 in direction toward the clutch disks 9 and 10, respectively, which are associated therewith. The actuating system for the clutch B which also has a radially inner and radially outer region, as shown in FIG. 3, is formed of a one-armed lever 11, which is pivoted at a bearing block 12 of the housing 3 by means of a pin 13. The lever 11 is connected to the pressure plate 7 by means of a pressure element 14.

Figure 2:
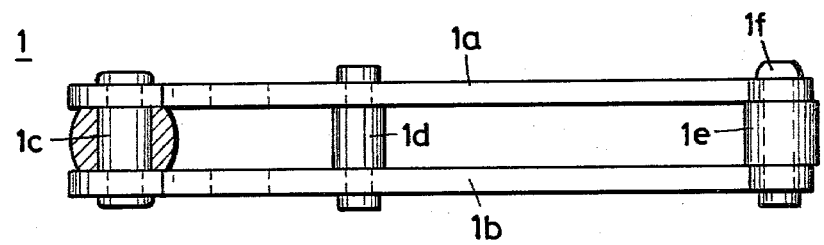
FIG. 2 is a fragmentary top plan view of FIG. 1 showing the actuating lever of the actuating system.

The lever 1 of a release or disengagement system for the clutch A is described hereinafter in detail with the aid of FIG. 2. The lever 1 is formed of two identical, flat, and stamped or punched-out sheet metal parts 1a and 1b, which, in the illustrated embodiment of FIG. 2, are held parallel to and at a fixed distance from one another by spacers 1c, 1d and 1e. The spacers 1c and 1d are formed by stepped or shoulder rivets, while the spacer 1e is connected to the two sheet-metal parts 1a and 1b by a rivet 1f. The spacer 1e is in the form of a roller or cylinder. The spacer 1c serves simultaneously for supporting the eye portion 5a of the eye-bolt tie rod 5 and is advantageously hardened over the cylindrical portion thereof in order to reduce wear. The bushing or sleeve spacer 1e, which is subjected to engagement by release or disengagement bearing or a pressure element 16, is advantageously also hardened.

Figure 4:
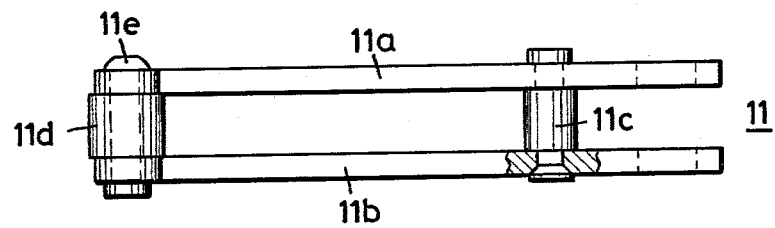
FIG. 4 is a fragmentary top plan view of FIG. 3 partly broken away and partly showing the actuating lever of the actuating system for the other clutch.

In a similar manner as for the lever 1, as shown in FIGS. 3 and 4, the lever 11 is also formed of two flat, stamped or punched-out sheet-metal parts 11a and 11b of identical shape, which are riveted together at a fixed distance from one another by spacers 11c and 11d. The spacer 11c is formed of a riveted spacer pin, while the spacer 11d is formed of a sleeve or bushing which is secured to the lever parts 11a and 11b by a rivet 11e. In the embodiment of FIGS. 3 and 4 also the portion of the spacer 11c between the two lever parts 11a and 11b is advantageously hardened, as well as the sleeve or bushing 11d, which is subjectible to engagement or impact by a release or disengaging or a pressure member or element 16.

By means of the spacer 11c, a pressure element 14 disposed between the sheet metal parts 11a and 11b and surrounding the spacer 11c radially inwardly with two bifurcated regions is simultaneously engaged or subjected to impact. In such an embodiment, the pressure element 14 can also be formed as a stamped or punched-out part in an especially simple and inexpensive manner.

It is advantageous to construct the pressure element 14 so that it has a stop or abutment surface 14b which is located opposite the bearing pin 13, the pressure element 14 being thereby secured against radial migration caused by centrifugal force.

The pressure element 14 furthermore has an abutment or stop surface 14c which extends in radial direction and engages the bearing pin 13 from below the latter, the bearing pin 13, acting as a counterstop, peventing excessive migration or excursion of the lever 11 in direction before maximum wear occurs at the linings of the disk 10.

Through the hereinafore-mentioned measures during transport in case the clutch is lifted by the levers 11, these levers 11 are prevented from being swung outwardly so far that the non-illustrated restoring will be bent out of shape, or that the pressure element 14 will be able to snap out of its lower anchoring point 15. Furthermore, the axial travel of the pressure plate in the engagement direction is limited by the heretofore-mentioned measures, so that the non-illustrated friction-lining rivets cannot damage the friction surfaces at the pressure plate 7 and the housing 3, when the limit of possible lining wear has been reached.

There are claimed:

1. In combination, a friction clutch comprising at least one pressure plate, a plurality of levers for actuating the pressure plate, each of said levers being disposed in substantially radial direction of said pressure plate and having a radially inner and a radially outer region, said levers, respectively, comprising a rigid, self-contained prefabricated unitary assembly of at least two stamped-out sheet-metal parts and at least two spacer members holding said sheet-metal parts mutually spaced at a fixed distance from one another, one of said spacer members being located at said radially inner region of said lever and having a portion extending beyond said sheet-metal parts in axial direction of the clutch; linkage means extending in said axial direction of the clutch and connecting a region intermediate said radially inner and said radially outer regions of said levers to said pressure plate, and disengagement means for disengaging the clutch being disposed at said one spacer member at said radially inner region of said lever for operatively actuating said portion of said one spacer member extending beyond said sheet-metal parts so as to disengage the clutch.

2. Friction cluch according to claim 1 wherein one of said spacer members serves as a pivot bearing for said linkage means connecting said lever to said pressure plate, said linkage means being received between said mutually spaced sheet-metal parts.

3. Friction clutch according to claim 1 wherein the clutch is a double clutch for motor vehicles and includes two pressure plates and a respective lever for actuating each of said pressure plates, each of said levers being formed of two stamped-out sheet-metal parts mutually spaced apart at a fixed spacing from one another by said spacer members.

4. Friction clutch according to claim 1 wherein said stamped-out sheet-metal parts are flat and of congruent shape.

5. Friction clutch according to claim 1 wherein said spacer members have a metallurgically hardened surface.

6. Friction clutch according to claim 1 wherein said spacer members are stepped rivets.

7. Friction clutch according to claim 1 wherein at least one of said spacer members is a riveted sleeve.

8. Friction clutch according to claim 1 wherein said lever is a one-arm lever, and said linkage means connecting said lever to said pressure plate is a pressure element having a portion thereof partly surrounding one of said spacer members and extending in radial direction of the friction clutch.

9. Friction clutch according to claim 8 wherein said pressure element is a stamped-out part.

10. Friction clutch according to claim 8 wherein said portion of said pressure element partly surrounding said one spacer member extends radially inwardly of the friction clutch.

11. Friction clutch according to claim 8 including a housing, and a pivot pin pivotally securing said one-arm lever to said housing, said pressure element being formed with an abutment surface engageable by said pivot pin, said abutment surface extending in axial direction of the friction clutch.

12. Friction clutch according to claim 8 including a housing and a pivot pin pivotally securing said one-arm lever to said housing, said pressure element being formed with a stop surface extending in radial direction of the friction clutch and serving as a bearing for said lever between said pivot pin, which serves as a counterstop and said pressure element, for limiting movement of said lever in a direction opposite the clutch disengaging direction.

13. Friction clutch according to claim 12 including a clutch disk and friction linings and wherein said stop surface and said counterstop pivot pin are disposed at a distance from one another corresponding substantially to the lining-thickness wear to be expected in the associated clutch disk.

* * * * *